July 8, 1941.    N. S. REYNOLDS    2,248,385

SEAL

Filed Sept. 3, 1940

INVENTOR
N. S. REYNOLDS

BY

ATTORNEY

UNITED STATES PATENT OFFICE 2,248,385

SEAL

Noel S. Reynolds, St. Louis, Mo.

Application September 3, 1940, Serial No. 355,107

3 Claims. (Cl. 288—14)

My invention relates to seals and more particularly to seals of the diaphragm type.

One of the objects of my invention is to provide a simple and efficient seal for use with two parallel annular surfaces on relatively rotatable members, said surfaces lying in planes at right angles to the axis of rotation.

Another object of my invention is to provide a seal which is so constructed of thin metal that an efficient sealing action can be obtained by direct metal contact with two parallel surfaces having relative rotation in planes at right angles to the axis of rotation.

Figure 1:
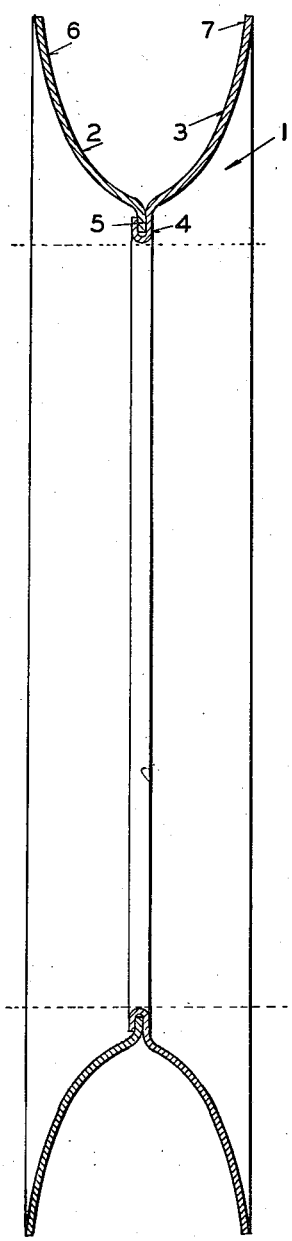
Figure 2:
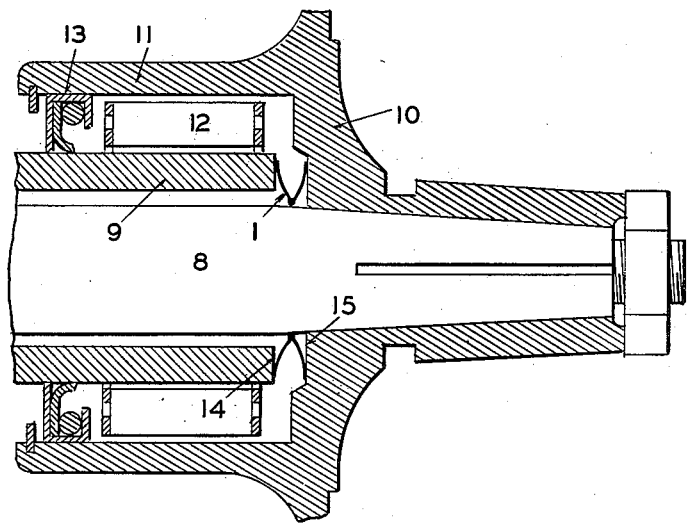
Figure 3:
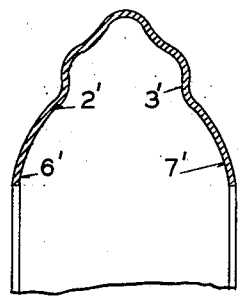

Other objects of my invention will become apparent from the following description taken in connection with the accompanying drawing in which Figure 1 is a sectional view of a seal embodying my invention; Figure 2 is a view showing the seal in operative position in a rear axle construction of an automobile; and Figure 3 is a sectional view showing a modified construction.

Referring to Figure 1, my improved seal, indicated by the numeral 1, is of annular form having a general V-shaped radial cross-section and is made from two annular elements or sides 2 and 3 of a metal alloy having good wear characteristics while at the same time being resilient. This metal is of a thickness between four and eight thousandths of an inch in order that the seal will have the proper resiliency in an axial direction. The elements are so dished that when connected together at their inner annular edges the peripheral portions will be axially spaced apart. The method shown of securing the parts together to obtain the seal consists of turning the inner marginal portion 4 of the element 3 over the marginal portion 5 of element 2 in order to clamp the latter portion to the former. The outer marginal portions 6 and 7 of the elements are formed so as to diverge slightly outwardly whereby each surface will be at a very small angle to a plane at right angles to the axis of the seal. The dishing of the elements is such that their outer surfaces will be convex and their inner surfaces concave. This is important as it permits the outer marginal portions 6 and 7, which engage flat surfaces on the two relatively rotatable members to be sealed, to be freely flexed axially toward each other a limited extent without resistance by the main body portion of the elements.

Although my improved seal may be used as an effective sealing means between any two parallel relatively rotatable surfaces which are substantially normal to the axis of rotation, I have found it to be particularly well adapted for efficiently sealing the rear axle construction of an automobile wherein the end of the axle housing and the wheel hub on the axle present opposed parallel surfaces. Such use, as by way of example, is shown in Figure 2 wherein 8 indicates the rotatable axle enclosed in a housing 9. Keyed on the outer end of the axle is a wheel hub 10 having an annular flange 11 in spaced surrounding relation to the end of the housing. Between the housing and flange is a bearing 12 which is lubricated by grease maintained around said bearing by a seal 13. The end of the housing is provided with a flat surface 14 which has spaced therefrom a parallel surface 15 on the hub. Between these two surfaces and co-operating therewith is my improved seal just described. This seal prevents any of the bearing grease from leaving the bearing and going into the housing. It also prevents any of the thinner grease in the housing (coming from the differential) from entering the bearing chamber and thinning the bearing grease. The seal in its normal condition prior to being positioned between the housing end and the hub, has an axial overall thickness from marginal portion 6 to portion 7 somewhat greater than the axial distance between the housing end surface 14 and the hub surface 15. Thus when the seal is mounted in the position shown, it will be axially compressed a limited extent which compression is permitted by the resiliency of the material of elements 2 and 3 and their dished form. This causes the marginal portions 6 and 7 of the seal to be in pressure engagement at all times with the flat surfaces 14 and 15 contacted thereby. The result is that a very effective seal is formed which will not permit the passage of lubricant in either direction. Any slight relative axial movement between the wheel hub and the axle housing will be permitted by the seal without affecting the sealing action. The surfaces in contact do not have such pressure engagement that undue wear will result due to relative movement between the hub and seal or the seal and housing. The opening in the seal which receives the axle is oversize so that the seal can shift slightly in a lateral direction.

From the above description it is apparent that my improved seal is simple in construction and economical to manufacture. It does not require a clamping at any of the sealing points. No sealing rings of special material, such as Bakelite, etc., are necessary as there is metal to metal contact between the engaging surfaces. The axial resiliency of the seal insures that the contacting surfaces will always be in pressure engagement.

I am aware that seals have been previously made of thin metal of general V-shaped cross-section and engage surfaces by a metal to metal contact but in these seals the axis of the V is parallel to the axis of rotation and the sealing portions of the seal engage curved concentric surfaces. In such constructions there can be resilient flexing permitting all portions of one sealing surface to be moved toward opposite portions of the other sealing surface and as soon as there is any wear, the sealing action is broken. In my improved seal if there is any wear of the sealing portions 6 and 7, this wear will be compensated for since these portions have pressure engagement with the surfaces they contact.

My improved seal may also be made in one piece as shown by the sectional view Figure 3. Also, as shown, the seal may be made so that the axially spaced marginal sealing portions are at the inner portion of the seal instead of at the periphery. The sides 2' and 3', which are integrally united at their peripheries, have inner marginal portions 6' and 7'. If desired, the sides can be corrugated as shown in order to make them somewhat more rigid against flexing toward each other in an axial direction. This seal functions in exactly the same manner as the seal of Figure 1 when placed in an operative position between two relatively rotatable parallel surfaces normal to the axis of rotation.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. A seal for use with two relatively rotatable members having annular spaced apart surfaces positioned parallel to each other and at substantially right angles to the axis of rotation, said seal comprising an annular member having a portion shaped to provide an edge engageable with one of said parallel surfaces in substantial line contact and another portion formed of thin resilient metal having a marginal edge adapted for substantial line contact for directly engaging the other of said parallel surfaces, said last named metal portion being concavo-convex to provide the marginal edge and cause it to be spaced a greater axial distance from the first portion than other points thereof and also providing for deflection of said marginal edge axially a considerable extent toward the first portion without permanent deformation of said metal portion to thus permit the seal to be placed in operative position so that said marginal edge has pressure engagement with its cooperating surface and maintains said condition notwithstanding the spaced apart surfaces have limited axial movement toward each other when the members have relative rotation.

2. A seal for use with two relatively rotatable members having annular spaced apart surfaces positioned at an angle to the axis of rotation, said seal comprising an annular structure of general V-shaped radial cross-section and being made from thin resilient material, the side walls thereof being dished and having their concave surfaces facing in a general radial direction and adapted when placed in use to engage said spaced apart surfaces with substantial line contact, the dished walls providing for flexing of the marginal portions a considerable extent toward each other without permanent deformation of any portion of the seal to thus permit the spaced surfaces and cooperating marginal portions of the walls to be originally placed in pressure engagement and maintained in such condition notwithstanding any limited axial movement of said surfaces toward each other when the members have relative rotation.

3. A seal for use with two relatively rotatable members having annular spaced apart surfaces positioned parallel to each other and at substantially right angles to the axis of rotation, said seal comprising two annular members of thin metal each secured to the other at one of their marginal edges to produce a seal of general V-shaped radial cross-section, said members being concavo-convex with their concave surfaces in opposed relation and the unjoined marginal edges of said members being normally spaced apart a greater radial distance than other opposed portions of said members at points closer to the juncture thereof so that the seal when in use will have its unjoined marginal edges in substantial line contact with the spaced apart surfaces and the form of the members will provide for the flexing of said edges a considerable extent toward each other without permanent deformation of any portion of the seal when there is limited axial movement of said surfaces toward each other as the members have relative rotation.

NOEL S. REYNOLDS.